US006953534B1

(12) United States Patent
Hudgens

(10) Patent No.: US 6,953,534 B1
(45) Date of Patent: *Oct. 11, 2005

(54) ENGINE ANTIFREEZE COMPOSITION

(75) Inventor: R. Douglas Hudgens, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 206 days.

This patent is subject to a terminal disclaimer.

(21) Appl. No.: 09/611,413

(22) Filed: Jul. 6, 2000

(51) Int. Cl.$^7$ .................................................. C09K 5/00
(52) U.S. Cl. ............................ 252/73; 252/71; 252/74; 252/75; 252/76; 252/78.3; 252/380; 252/387; 252/388; 252/389.2
(58) Field of Search ............................. 252/71, 74, 75, 252/76, 78.3

(56) References Cited

U.S. PATENT DOCUMENTS

| 3,607,757 A | 9/1971 | McDonald | 252/75 |
| 3,931,029 A | 1/1976 | Dutton et al. | 252/76 |
| 4,342,596 A | 8/1982 | Conner, Sr. | 106/14.13 |
| 4,382,008 A | 5/1983 | Boreland et al. | 252/75 |
| 4,452,758 A | 6/1984 | Wilson et al. | 422/15 |

(Continued)

FOREIGN PATENT DOCUMENTS

| DE | 195 47 499 | 5/1997 |
| EP | 0242900 B1 | 7/1991 |
| EP | 0552988 A1 | 7/1993 |
| EP | 0739 965 | 10/1996 |
| GB | 2 049 650 | 12/1980 |
| GB | 2 138 837 | 10/1984 |

OTHER PUBLICATIONS

Abstract: Database WPI Section Ch, Week 199313, Derwent Publications Ltd., Xp–002260154.

(Continued)

Primary Examiner—Yogendra N. Gupta
Assistant Examiner—D. G. Hamlin
(74) Attorney, Agent, or Firm—Woodard, Emhardt, Moriarty, McNett & Henry LLP

(57) ABSTRACT

In general this invention relates to an antifreeze composition that can be used in the cooling systems of internal combustion engines, for example, in heavy-duty diesel engines, light duty trucks and cars. The antifreeze composition can be added to water or other suitable liquid coolant in the cooling system, to lower the freezing point temperature of the coolant and inhibit corrosion of metallic components associated with the cooling system. The antifreeze composition is particularly well suited, although not exclusively, for use with hard water. The antifreeze composition includes an organic acid component comprising adipic acid and at least one of benzoic acid and one or more $C_9$–$C_{12}$ dicarboxylic acid—or salts of these acids. The antifreeze composition also includes other anti-corrosive additive, for example, molybdate, nitrite, nitrate silicate azoles and a variety of buffer agents.

25 Claims, 1 Drawing Sheet

U.S. PATENT DOCUMENTS

| | | | |
|---|---|---|---|
| 4,454,050 A | 6/1984 | Bertell | 252/42 |
| 4,548,787 A | 10/1985 | Wilson et al. | 422/15 |
| 4,561,990 A | 12/1985 | Darden | 252/75 |
| 4,587,028 A | 5/1986 | Darden | 252/76 |
| 4,640,793 A | 2/1987 | Persinski et al. | 252/82 |
| 4,647,392 A | 3/1987 | Darden et al. | 252/75 |
| 4,717,495 A | 1/1988 | Hercamp et al. | 252/75 |
| 4,775,415 A | 10/1988 | Mohr et al. | 106/14.05 |
| 4,798,683 A | 1/1989 | Boffardi et al. | 252/389.54 |
| 4,851,145 A | 7/1989 | Van Neste et al. | 252/75 |
| 4,869,841 A | 9/1989 | Matteodo et al. | 252/79 |
| 4,873,011 A | 10/1989 | Jung et al. | 252/75 |
| 4,946,616 A | 8/1990 | Falla et al. | 252/75 |
| 5,002,697 A | 3/1991 | Crucil et al. | 252/389.23 |
| 5,071,580 A | * 12/1991 | Little | 252/71 |
| 5,085,793 A | 2/1992 | Burns et al. | 252/79 |
| 5,192,447 A | 3/1993 | Fivizzani | 210/697 |
| 5,288,419 A | 2/1994 | Turcotte et al. | 252/76 |
| 5,320,779 A | 6/1994 | Fivizzani | 252/394 |
| 5,387,360 A | 2/1995 | Uekusa et al. | 252/73 |
| 5,422,026 A | 6/1995 | Greaney | |
| 5,607,521 A | 3/1997 | Bech-Nielsen et al. | 148/261 |
| 5,646,211 A | 7/1997 | Honda et al. | 524/406 |
| 5,668,096 A | 9/1997 | Rodzewich et al. | 510/265 |
| 5,800,732 A | 9/1998 | Coughlin et al. | 252/180 |
| 5,997,763 A | 12/1999 | Pabon, Jr. et al. | |

OTHER PUBLICATIONS

Standard Specification for Fully–Formulated Ethylene–Glycol–Base Engine Coolant for Heavy–Cuty Engines, ASTM Designation: D6210—98a, 1998.

Worden, J.A., et al., "Development of Aluminum Cooling System Components for a 10.8 Liter Diesel Engine", SAE Technical Paper Series Paper No. 960643, prepared for the International Congress & Exposition, Detroit Michigan, Feb. 26–29, 1996.

Weir, T.W., et al., "Review of Organic Acids as Inhibitors in Engine Coolants", Paper No. 960641, Society of Automotive Engineers, Inc., 1996.

Weir, Thomas W., "Testing of Organic Acids in Engine Coolants", Engine Coolant Testing: Fourth Volume, ASTM STP 1335, R.E. Beal, Ed., American Society for Testing and Materials, 1999, pp. 7–22.

Mitchell, Wayne A.; Hudgens, R. Douglas, "Development of an Extended–Service Coolant Filter", Standard Technical Publication 1335, American Society for Testing and Materials, 1999.

Cummins Service Bulletin No. 3666132–01, "Cummins Coolant Requirements and Maintenance", Cummins Engine Company, Inc., Dec. 1999.

* cited by examiner

US 6,953,534 B1

ENGINE ANTIFREEZE COMPOSITION

FIELD OF THE INVENTION

In general, this invention is related to a coolant composition. More specifically, but not exclusive, this invention is directed to a coolant composition that includes anticorrosion additives for use in combustion engines and a method of inhibiting the corrosion of components in cooling systems.

BACKGROUND OF THE INVENTION

Typically coolant compositions are specifically formulated with ethylene glycol or propylene glycol or their derivatives and include specific additives that inhibit and reduce corrosion of coolant systems. Specific coolant formulations are desired because with the advent of higher performance engines, particularly heavy-duty diesel engines, increasing more components of these engines are manufactured from a wide variety of materials to reduce weight and increase efficiency. Similarly, the coolant coursing through these engines contact a variety of materials. Typically additives are selected to impart particular benefits, such as providing protection for one or more selected materials. In addition, it is not uncommon for the additives to be selected to compliment each others beneficial properties. Despite the specificity which these coolant compositions are formulated, the benefits associated with many of the additives can be thwarted because a large percentage of operators include hard water in the cooling system. The hard water can be added either upon initially filling the cooling system or during in-service as operators add make-up water to top off the cooling system.

In many parts of the world, there is no ready access to suitable water for use in cooling system. Hard water includes a number of minerals, most notably calcium, magnesium and iron salts. These minerals may contribute to loss of efficacy and reduce the usable lifetime of the coolant composition. This loss can be particularly detrimental to heavy duty diesel trucks that can cover over 10,000 miles a month. An ineffective coolant composition can shorten engine life, allow internal passageways in the cooling system to clog, contribute to cylinder liner pitting and water pump cavitation all which result in costly engine overhauls.

Thus in light of the above described problems, there is a continuing need for advancements in the coolant compositions and improved methods for reducing corrosion associated with cooling compositions. The present invention is such an advancement and provides a wide variety of benefits and advantages.

SUMMARY OF THE INVENTION

The present invention relates to novel coolant compositions, the manufacture and use thereof. Various aspects of the invention are novel, nonobvious, and provide various advantages. While the actual nature of the invention covered herein can only be determined with reference to the claims appended hereto, certain forms and features, which are characteristic of the preferred embodiments disclosed herein, are described briefly as follows.

In one form the present invention provides an engine coolant composition that can be used in a cooling system. The engine coolant composition comprises: an organic acid component or salt thereof. The organic acid component can include a $C_4$–$C_6$ dicarboxylic acid and at least one of benzoic acid and a $C_9$–$C_{12}$ aliphatic dicarboxylic acid. The engine coolant also comprises an anticorrosion additive including molybdate, and at least one of mercaptobenzothiazole, benzotriazole, tolyltriazole, nitrite, nitrate, and silicate; a buffer component comprising a sodium salt of at least one of a borate salt, and/or a phosphate salt and a freezing point depressant. In one embodiment the organic acid component of the coolant composition includes adipic acid, benzoic acid and optionally a $C_9$–$C_2$ aliphatic dicarboxylic acid. In other embodiments the coolant composition includes molybdate, nitrite, nitrate and at least one of mercaptobenzothiazole or tolytriazole and a buffering agent.

In another form the invention provides an engine coolant composition comprising an organic acid component or salt thereof. The organic acid component can include adipic acid and at least one of benzoic acid and a $C_9$–$C_{12}$ aliphatic dicarboxylic acid or salts of these acids; an anticorrosion additive including molybdate, and at least one of mercaptobenzothiazole, benzotriazole, tolyltriazole, nitrite, nitrate, and silicate; a buffer component comprising at least one of a borate salt or a phosphate salt and hard water.

In still yet another form the present invention provides a method of reducing the corrosion of metal surfaces in a cooling system having a recirculating liquid coolant comprising hard water. The method comprises adding an additive to the liquid coolant. The additive can include an organic acid component or salt thereof, a anti-corrosion additive and a buffer agent. The acid component can comprise a mixture of a $C_4$–$C_6$ dicarboxylic acid and at least one of benzoic acid or a $C_9$–$C_2$ aliphatic dicarboxylic acid. The anti-corrosion additive can include molybdate, and at least one compound selected from the group consisting of: mercaptobenzothiazole, benzotriazole, tolyltriazole, nitrite, nitrate, and silicate.

Further objects, features, aspects, forms, advantages and benefits shall become apparent from the description and drawings contained herein.

DETAILED DESCRIPTION OF THE INVENTION

Figure 1:
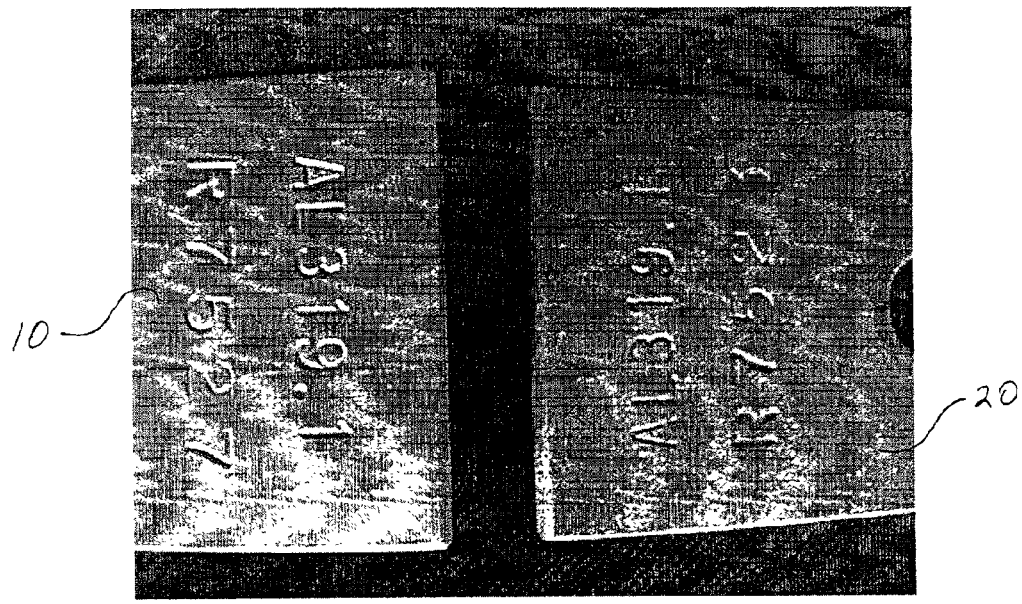
FIG. 1 is a scanned image of two aluminum coupons after evaluation in different engine antifreeze compositions according to the Erosion Corrosion Bench Test.

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

In general, this invention is directed to an engine coolant composition for heavy duty diesel engines, light duty trucks and automobiles. This invention can also provide various other advantageous applications, for example, in any heat-transfer application, preferably using an aqueous-based or alcohol-based (including glycols) or otherwise compatible heat-transfer medium. The coolant composition provides excellent antifreeze capabilities and therefore lowers the temperature at which the engine coolant begins to solidify or freeze. In preferred embodiments, this invention includes an organic acid component of a $C_4$–$C_6$ dicarboxylic acid and at least one other organic acid in combination with other anti-corrosion additives and buffering agents to reduce corrosion of metal components and clogging of internal system passageways. It has been determined that certain preferred embodiments unexpectedly exhibit enhanced anti-corrosion properties in the presence of hard water.

The term "hard water" when used in this present application is understood as water that includes a variety of minerals or inorganic salts, particularly cationic alkali metal salts, for example, calcium salts, magnesium salts, iron salts. Hard water can typically be evaluated in terms of its hardness level, which is often reported in parts per million (ppm). Hardness can be determined using a variety of commercially available water test kits, for example, using a test kit sold under the trademark Monitor C™ by Fleetguard, Inc. Water is considered to be hard at a hardness level of about 170 ppm or greater and very hard at a hardness level of about 300 ppm or greater.

In preferred formulations, the engine coolant composition of the present invention includes a specifically tailored combination of organic acids, anti-corrosion agents and buffering agents to reduce the corrosion associated with hard water. This can provide an added benefit of allowing a lower concentration of selected agents to yield equally effective anti-corrosion protection. The present invention provides an enhanced benefit of reducing precipitation of salts associated with the use of hard water in coolant systems.

The cooling composition can be provided as a liquid concentrate or as a ready-to-use formulation, i.e., a prediluted formulation. The ready-to-use formulation can be used "as is" in a cooling system. More preferably the ready-to-use formulation is diluted with water at a dilution ratio, by volume, of about 1 part formulation to 0.4 parts water to about 1 part formulation to about 1.6 parts water.

The engine coolant composition of the present invention includes an organic acid component and other anti-corrosive additives. It should be understood that the organic acids impart significant anti-corrosive properties, as well as other beneficial properties. The organic acid component consists essentially of a $C_4$–$C_6$ aliphatic dicarboxylic acid and at least one of an aromatic carboxylic acid and a $C_9$–$C_{12}$ dicarboxylic acid or salts of these acids. The anti-corrosive additives can be a combination of inorganic and organic agents.

Specific examples the $C_4$–$C_6$ aliphatic dicarboxylic acid for use in the present invention include maleic acid, succinic acid, and adipic acid. In a more preferred form, the organic acid component includes adipic acid. The C4-C6 aliphatic dicarboxylic acid is included in the coolant composition in an amount sufficient to inhibit corrosion of metal surfaces in the cooling system. Preferably the coolant composition includes the $C_4$-$C_6$ aliphatic dicarboxylic acid in an amount between about 0.1 weight percent (wt %) and about 5 wt % measured as the free acid and based upon the total weight of the coolant composition. More preferably, the coolant composition includes between about 0.1 wt % and about 1 wt % of adipic acid; still yet more preferably, the coolant composition includes between about 0.1 wt % and about 0.5 wt % of the adipic acid. It has been unexpectedly determined that when the coolant composition includes the minor amount of adipic acid, the coolant composition exhibits significantly enhanced anti-corrosive properties, particularly when the coolant composition is combined with hard water.

The organic acid component can also include an aromatic carboxylic acid. Preferably the aromatic carboxylic acid is selected to include benzoic acid or a salt thereof. The coolant composition includes the aromatic carboxylic acid in varying amounts. When the coolant composition is provided in a ready-to-use formulation, the coolant includes between about 0.1 wt % and about 5 wt % benzoic acid or benzoate measured as the free acid and based upon the total weight of the coolant composition. More preferably, the coolant composition includes between about 0.5 wt % and about 2.5 wt % benzoic acid or benzoate; still yet more preferably the coolant composition includes between about 0.6 wt % and about 1.5 wt % benzoic acid or benzoate.

The organic acid component can also include a $C_9$–$C_{12}$ dicarboxylic acid. Preferably the $C_9$–$C_{12}$ dicarboxylic acid is selected to include azelaic acid, sebacic acid, undecanedioic acid and dodecanedioic acid or salts of these acids. The coolant composition includes the $C_9$–$C_{12}$ dicarboxylic acid in varying amounts. When the coolant composition is provided in a ready-to-use formulation, the coolant includes between about 0.1 wt % and about 5 wt % $C_9$–$C_{12}$ dicarboxylic acid or salt thereof measured as the free acid and based upon the total weight of the coolant composition. More preferably, the coolant composition includes between about 0.5 wt % and about 2.5 wt % of a $C_9$–$C_{12}$ dicarboxylic acid or salt thereof; still yet more preferably the coolant composition includes between about 1.0 wt % and about 2.0 wt % $C_9$–$C_{12}$ dicarboxylic acid or salt thereof. In alternative embodiments of this invention, the coolant composition can include between about 2.0 wt % and about 3.0 wt % of the $C_9$–$C_{12}$ dicarboxylic acid or salt thereof.

The salts of these acids are preferably, but not exclusively, ammonium, tetraalkyl ammonium and alkali metal salts and would include, for example, lithium, sodium and potassium cations. Although it is understood that sodium and potassium salts are more preferred.

The coolant composition of the present invention also includes additional anti-corrosive additives. The anti-corrosive additives can be either an organic additive or an inorganic additive. Examples of organic anti-corrosive additives include benzotriazole, tolytriazole, mercaptobenzothiazole, sulfonates and imidazolines. Preferably the coolant composition of the present invention includes tolytriazole and/or mercaptobenzothiazole. The organic anti-corrosive additives can be included in varying amounts, preferably between about 0.05 wt % and about 0.5 wt %. More preferably, the coolant composition includes between about 0.1 wt % and about 0.5 wt % of the individual organic anti-corrosive additives.

The coolant composition can also include inorganic anti-corrosive additives. The inorganic additives include borates, phosphate silicates, nitrates, nitrites and molybdates. These inorganic anti-corrosive additives can be employed at concentrations ranging between about 0.0 wt % and about 5.0 wt % for the ready-to-use formulation. The inorganic anti-corrosive additives can be provided as salts, preferably ammonium, tetraalkyl ammonium, or alkali metal salts. In preferred forms the coolant composition includes two or more of the inorganic anti-corrosive additives.

In preferred forms, the coolant composition includes molybdate and at least one anti-corrosive additive selected from the group consisting of mercaptobenzothiazole, benzotriazole, tolytriazole, a silicate salt, a nitrite salt and a nitrate salt. The basic coolant composition can be tailored for selective applications to provide enhanced aluminum protection for components of the coolant system, for example, nitrates and silicates are known to provide aluminum protection. Borates and nitrites can be added for ferrous metal protection, and benzotriazole and tolytriazole can be added for copper and brass protection. Furthermore, for heavy-duty specifications, the coolant composition can include varying amounts of an alkali metal nitrite to provide enhanced protection against pitting of cylinder liners for heavy-duty diesel engines. The coolant composition can include between about 0.0 wt % to about 0.5 wt % of each of the desired additives. More preferably, the coolant composition can include between about 0.05 wt % to about 0.5 wt % of the additives; still yet more preferably between about 0.1 wt % to about 0.5 wt % of the additives.

The coolant composition can also include buffering agents. The buffering agents can be selected from any known or commonly used buffering agents. It will be appreciated by those skilled in the art that selected buffering agents can exhibit both anti-corrosion and buffering properties. For example benzoate, borates and phosphates can in certain formulations provide both buffering and anti-corrosion advantages. Preferred examples of buffers include borate salts and phosphate salts. In one preferred form, the buffering system includes a mixed phosphate/borate buffer system. It will also be understood by those skilled in the art that certain engine manufacturers, governmental organizations and/or consumers prefer or even require selected buffering systems. While the choice of a selected buffer system is not critical for the practice of this invention the buffering agents(s) can be selected to comply with desires and demands of end users. In addition a base can be included into the coolant composition to help adjust the pH to the desired pH level. Illustrative examples of bases for use with this invention included commonly known and used bases, for example, inorganic bases including KOH, NaOH, and weaker bases such as $NaHCO_3$, $K_2CO_{3a}$ and $Na_2CO_3$. Therefore, the buffering system and base can be adapted to provide a coolant composition having a pH level between 7.5 and about 11 pH units. More preferably, the buffering system and base is selected to provide a coolant composition with a pH level between about 8.0 and about 9.0 pH units.

A fully formulated coolant typically includes a variety of other additives, including, for example, defoamers, scale inhibitors, surfactants, detergents, and dyes. Specific examples of defoamers include components (alone or in combination) such as silicon defoamers, alcohols such as polyethoxylated glycol, polypropoxylated glycol or acetylenic glycols. Examples of scale inhibitors include components, either alone or in combination, such as, for example, phosphate esters, phosphino carboxylate, polyacrylates, polymethacylate, styrene-maleic anhydride, sulfonates, maleic anhydride co-polymer, acrylate-sulfonate co-polymer and the like. Surfactants for use in this invention include, for example, either alone or in combination: Alkyl sulfonates, acryl sulfonates, phosphate esters, sulfosuccinate, acetylenic glycol, and ethoxylated alcohols. Detergents include non-ionic and/or anionic components such as, for example, phosphate ester surfactants, sodium alkyl sulfonates, sodium aryl sulfonates, sodium alkyl aryl sulfonates, linear alkyl benzene sulfonates, alkylphenols, ethoxylated alcohols, carboxylic esters, and the like.

The coolant composition of the present invention is blended to provide a uniform composition. The order of addition of the individual components is not critical for the practice of the invention. However, it is desired to the coolant composition be thoroughly blended and that all the components be completely dissolved to provide optimum performance. As discussed above, in one preferred form, the coolant composition is provided as a ready-to-use, i.e. pre-diluted, formulation. When thus provided, the ready-to-use formulation can also include a freezing point depressant. The freezing point depressant can be selected from a variety of known and/or commonly used freezing point depressants. Commonly used examples include, for example, propanol, monoethylene glycol, diethylene glycol, propylene glycol, and the like. When provided in the coolant composition, the freezing point depressant is added in amounts ranging between about 30 wt % and about 70 wt % based upon the total weight of the coolant composition. The ready-to-use coolant composition can also include varying amounts of water In another form, the coolant composition of the present invention can be provided as a liquid concentrate. Typically, the liquid concentrate includes an alcohol or glycol and additionally can, but is not required, to include small amounts of water to dissolve the additives. The liquid concentrate can be added to a cooling system and diluted with water to provide a liquid coolant. To provide optimum performance, the liquid concentrate should be thoroughly blended with the water prior to use. It is preferable, but not required, to pre-mix the concentrate with the coolant before adding to the coolant system rather than using the radiator as a mixing chamber.

The coolant composition that includes adipic acid provides enhanced anti-corrosion properties over compositions lacking either one of these acids or salts of these acids. The cooling composition provides enhanced aluminum and ferrous metal protection against corrosion of the coolant in the cooling system.

The cooling composition of the present invention provides unexpected results or enhanced protection in hard water. It is not uncommon for cooling system for diesel engines and automobile engines to include water as part of the coolant medium. Furthermore, during operation, the cooling systems frequently lose fluid either due to leakage or evaporation. Often, operators add make-up fluids such as water to the cooling system. The make-up fluid frequently is hard water, which is found in many parts of the world. Hard water can cause many deleterious effects on the components of the cooling systems. These effects include increased corrosion of metal surfaces, particularly iron and aluminum surfaces. Furthermore, the hard water can cause incompatibility problems with some of the anti-corrosion components. For example, hard water containing calcium and magnesium salts can cause additives to precipitate or gel. This can decrease engine protection and increase corrosion. In a typical on-highway heavy-duty diesel engine cooling system, the flow rate can range from 80 to 150 gallons per minute. This means that flow velocities can reach 8 to 10 feet per second. Tests have shown that solder and aluminum are sensitive to the effects of high flow rate. These effects are acerbated by the addition of any solid or gelled additives.

It has unexpectedly been determined that the addition of adipic acid significantly enhances the protection of aluminum components in contact with hard water. For example, if additives, such as silicates, precipitate from the coolant composition, the desired aluminum protection previously afforded by the soluble silicate is drastically reduced. While not to be bound by any theory, it is thought that adipic acid and its salts provide significant enhanced aluminum metal protection, and at least part of this effect may be attributed to reduced precipitation of certain additives.

While not to be considered limiting in any fashion, it is also thought that the addition of adipic acid to the cooling composition provides enhanced protection for metal surfaces by chelating or combining with the alkali metal cations, specifically calcium and magnesium. These cations contribute to the buildup of scale on hot metal surfaces. The scale can drastically reduce and even eliminate flow through passageways in the cooling system. The scale can also inhibit efficient heat transfer from the hot metal surfaces to the coolant. Chelation of these cations can help reduce scale formation on hot surfaces and significantly reduces the detrimental effects of scale buildup.

It has been observed that adipic acid in hard water can also provide a thin surface coating on many metal components, particularly aluminum components of the cooling system. This coating can range up to several angstroms thick. While not considered to be limiting in any fashion, it is thought that this coating protects the metal surface from corrosion but does not appreciably affect heat transfer.

In addition to providing make-up water for in-use cooling systems, frequently operators will add supplemental cooling additives to their cooling systems. Typically, the supplemental cooling additives include a variety of anti-corrosion agents as specified above. It is not uncommon for an operator to "overdose" selected components of the anti-corrosive additive. In particular, it has been noted that nitrite levels in over-the-road diesel engine cooling systems have been increased to levels that can be detrimental to the aluminum and solder components of the cooling systems. The present invention provides enhanced protection for aluminum surfaces, thereby ameliorating some of the effects of over-dosing. It has also been determined that molybdate and the organic diacids provide ferrous and cylinder lining protection. Because the anti-corrosion properties are enhanced, the concentration of selected additives, for example, nitrite salts, can be reduced. This reduces the likelihood that an operator will overdose the cooling system with nitrite.

For the purpose of promoting further understanding and appreciation of the present invention and its advantages, the following Example is provided. It will be understood, however, that these Examples are illustrative and not limiting in any fashion.

EXAMPLE

Five coolant compositions listed as Examples 1–5 in Table 1 were prepared by combining the specific indicated components listed in the table in a fully formulated base antifreeze solution that included, in percent by weight based on the final total weight of the final antifreeze formulation, 95% ethylene glycol, sodium borate (0.20%); sodium molybdate (0.30%); mercaptobenzothiazole (MBT) (0.40%, 50% active); tolyltriazole (0.20%); sodium silicate (0.10%) as well as surfactants, scale inhibitors and defoamers (0.05 %) to provide a concentrated coolant composition. Each of the concentrated coolant compositions was then diluted with water having a hardness of about 300 ppm and a pH between about 8.3 and about 8.5 to provide the coolant compositions listed as examples 1–5. These coolant compositions were then evaluated according to ASTM D-2809 Standard Text Method for Cavitation Corrosion and Corrosion and Erosion-Corrosion Bench Test described below.

TABLE 1*

Concentrated Coolant Compositions

| Components | Example 1 | Example 2 | Example 3 | Example 4 | Example 5 |
|---|---|---|---|---|---|
| Adipic acid | 1.0% | — | — | 0.20% | 0.20% |
| Sebacic acid | — | 1.00% | — | — | — |
| Dodecane-dioic acid | — | — | 1.0% | 1.4% | 1.4% |
| $NaNO_2$ (Nitrite) | 0.36% | 0.36% | 0.36% | 0.36% | 0.20% |
| Test Procedure | | | | | |
| ASTM D-2809 | 6 | 7 | 7–8 | 7 | 8 |
| Erosion Corrosion Bench Test | 0.4 mg | 12.4 mg | 87 mg | 4.8 mg | 4.9 mg |

*Examples 1–5 were diluted 50:50 with water having a hardness of 300 ppm for both test procedures.

Erosion Corrosion Bench Test Procedure

This test procedure can help evaluate the effect of high flow velocities on solder and aluminum components. A fixture containing three preweighed bundles were placed in line of a flowing system. The flow rate and temperature were held constant throughout the test. The aluminum specimens were galvanically coupled to cast iron. The test duration was seven days. At the end of test, the weight loss due to erosion corrosion was determined on the aluminum samples. The flow stand had a loop capable of flowing 15 gallons (57 liters) of test solution at 5–50 gal. per minute (19–190) liters per minute), and holding 3 sets of test bundles (1 ⅝in. (5.1 cm) diameter radiator hose). Test fixture was capable of holding 3 sets of test bundles (17 in. (43 cm) length).

A. Specimens and Test Solution Preparation:

Specimens: Aluminum and Cast Iron samples are of the type used in ASTM D1384 glassware test. Various aluminum alloys for testing can be obtained from Metal Samples Co., Inc. Munford, Alabama. The samples were cleaned before testing by placing them in acetone to remove processing oils. The samples were then wrapped in an absorbent towel and placed in dessicator to dry. Test solutions were prepared by combining antifreeze and SCA formulations in 300 ppm hard water. The hard water contained 277 mg $CaCl_2$, 123 Mg $MgSO_4 \cdot 7H_2O$, and 210 mg $NaHCO_3$ per liter.

B. Test Procedure:

1. Samples were to the nearest 0.1 mg. Then using ASTM D-1384 hardware, test bundles were prepared in the following sequence: teflon spacer, aluminum specimen, steel spacer, cast iron specimen, steel spacer, aluminum specimen, teflon spacer. A brass machine screw was inserted through the test fixture and the test bundle in order to secure the bundle to the fixture. The aluminum specimens in each bundle were of the same alloy.

2. All bundles were prepared in this same sequence. The other bundles were attached to the test fixture, making sure that there is at least 4 inches between each bundle on the fixture.

3. T he test fixture was placed in the flow loop and the connections secured to prevent leakage.

4. The t test solution we re heated to 88° C. (190° F.) and flow direct through the flow loop.

5. The flow rate was adjusted to achieve the proper flow velocity across the test fixture.

6. At the completion of the test, test fixtures were removed from flow loop.

7. The test bundles were dissembled and cleaned in accordance with ASTM D-1384. After drying the samples their weight was determined to the nearest 0.1 mg.

C. Calculations:

Weight loss=A-B =C, where A=Weight before test, B=Weight after test, and C=Weight loss.

Due to the configuration of the individual test bundles, each alloy was run in duplicate. The individual weight losses for a single alloy agreed within 20%, and the average weight loss in milligrams was reported. (J. A. Worden, J. F. Burke & T. Cox, "Development of Aluminum Cooling System Components for a 10.8 liter Diesel Engine", SAE Technical Paper Series 960643 pp. 46–59, 1996, incorporated herein by reference).

Figure 2:
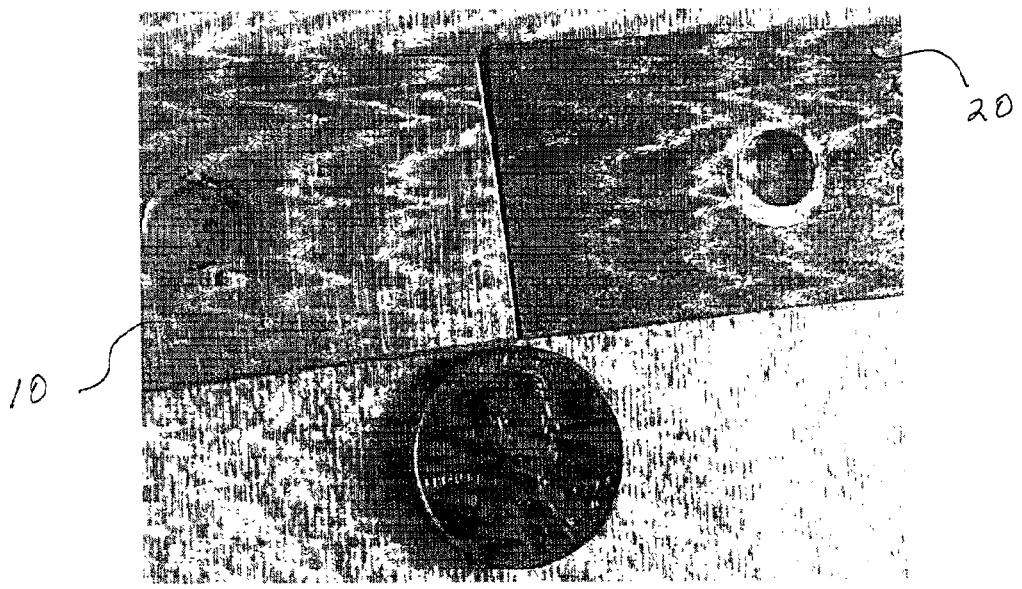
FIG. 2 is a scanned of an alternate view of the coupons depicted in FIG. 1.
Figure 1:
Figure 2:
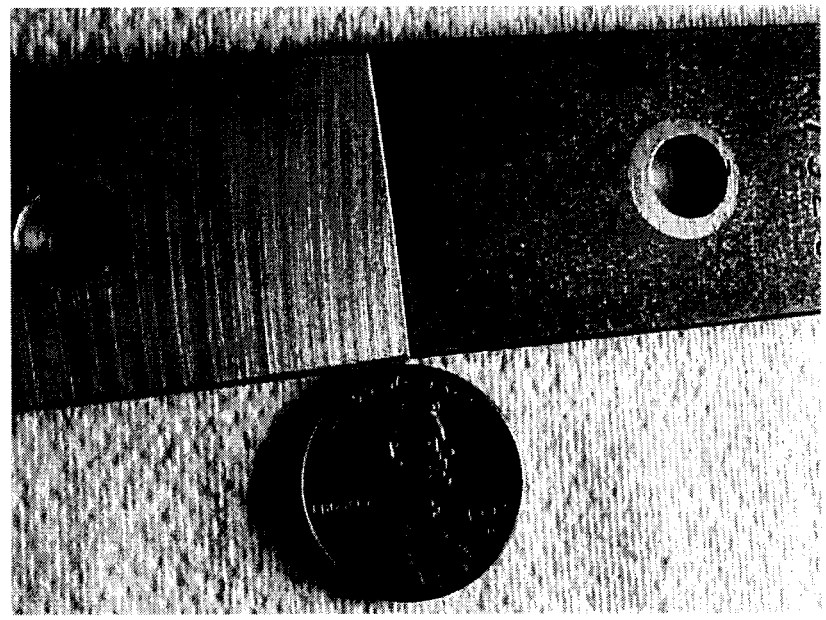

As can be seen from Table 1, the coolant composition containing adipic acid provides enhanced aluminum protection in the presence of hard water. Further as can be observed for Examples 4 and 5, inclusion of adipic acid in amounts as low as 0.2 wt % based upon the total weight of the coolant additive provides enhanced aluminum protection. FIGS. 1 and 2 are scanned images of portions of two aluminum coupons that were subjected to the Erosion Corrosion Test. Coupon 10 was immersed the Example 1 coolant formulation. Coupon 20 was immersed in the Example 3 coolant formulation. It can be readily observed that coupon 20 has significantly more surface erosion than coupon 10. The original milling marks can still be seen on coupon 10 as a series of substantially parallel lines or scratches extending across the width of the coupon. Conversely, coupon 20 is pitted, and the original milling marks are absent. The surface of coupon 20 was eroded sufficiently to remove the milling marks.

Further, it is understood that the addition of adipic acid synergistically enhances the protection of both aluminum and iron surfaces in the presence of nitrite salts and molybdate salts. In alternative embodiments, the addition of a combined organic acid component that includes adipic acid and sebacic acid provides even enhanced protection for the metal surfaces of the cooling system.

The present invention contemplates modifications as would occur to those skilled in the art. It is also contemplated that compositions and processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art.

Further, any theory of operation, proof, or finding stated herein is meant to further enhance understanding of the present invention and is not intended to make the scope of the present invention dependent upon such theory, proof, or finding. While the invention has been illustrated and described in detail in the drawings, examples and foregoing description, the same is considered to be illustrative and not restrictive in character, it is understood that only the preferred embodiments have been shown and described and that all changes and modifications that come within the spirit of the invention are desired to be protected.

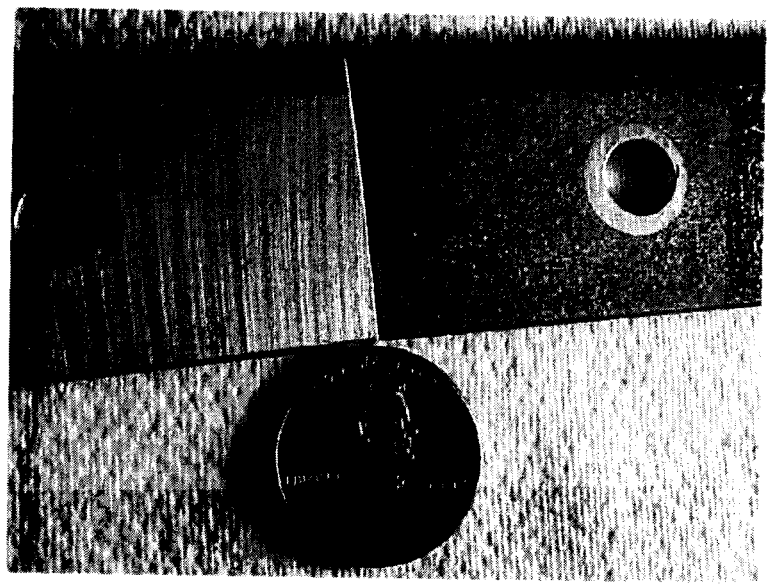

What is claimed is:

1. An engine coolant composition comprising:

an organic acid component or salt thereof, said organic acid component comprising adipic acid and at least one of benzoic acid and a $C_9$–$C_{12}$ aliphatic dicarboxylic acid;

an anticorrosion additive including molybdate, and at least one of mercaptobenzothiazole, benzotriazole, tolyltriazole, nitrite, nitrate, and silicate;

a buffer component comprising a sodium salt of at least one of a borate salt or a phosphate salt and a freezing point depressant.

2. The coolant composition of claim 1 wherein the adipic acid or a salt thereof is included in an amount between about 0.1 wt % and about 5 wt %, measured as the free acid and based on the total weight of the coolant composition.

3. The coolant composition of claim 1 comprising between about 0.5 wt % and about 10 wt % of the organic acid component, measured as the free acid and based upon the total weight of the coolant composition.

4. The coolant composition of claim 1 wherein the benzoic acid or $C_9$–$C_{12}$ aliphatic dicarboxylic acid is included in an amount between about 0.5 wt % and about 5 wt %, measured as the free acid and based on the total weight of the coolant composition.

5. The coolant composition of claim 1 provided to have a pH level between about 7.5 and about 11 pH units.

6. The coolant composition of claim 1 provided as a liquid concentrate.

7. The coolant composition of claim 1 provided as a ready-to-use-formulation for a internal combustion engine cooling system.

8. The composition of claim 1 comprising:

an organic acid component or salt thereof including adipic acid, benzoic acid and at least one $C_9$–$C_{12}$ aliphatic dicarboxylic acid;

an anticorrosion additive including molybdate, nitrite, nitrate, silicate and at least one of mercaptobenzothiazole, benzotriazole, or tolyltriazole;

a borate salt; and a freezing point depressant.

9. The composition of claim 1 comprising:

an organic acid component or salt thereof, said organic acid component consisting of adipic acid, benzoic acid and at least one $C_9$–$C_{12}$ aliphatic dicarboxylic acid;

an anticorrosion additive including molybdate, nitrite, nitrate, and at least one of mercaptobenzothiazole, benzotriazole, or tolyltriazole;

a phosphate salt; and a freezing point depressant.

10. The composition of claim 1 comprising:

between about 0.1 wt % and about 0.5 wt % adipic acid, between about 1.0 wt % and about 2.0 wt % of an aliphatic dicarboxylic acid or a salt thereof, said dicarboxylic acid selected from the group consisting of: sebacic acid, dodecanedioic acid and mixtures thereof, between about 0 wt % and about 0.5 wt % nitrite salts, between about 0 wt % and about 0.5 wt % nitrate salts, between about 0 wt % and about 0.5 wt % molybdate salts, between about 0 wt % and about 0.5 wt % silicate salts, between about 0.1 wt % and about 0.5 wt % of at least one of mercaptobenzothiazole, benzotriazole, or tolyltriazole, and between 0.1 wt % and about 0.5 wt % of at least one of borate salts and phosphate salts; and between about 80 wt % to about 99 wt % of at least one of ethylene glycol or propylene glycol.

11. A coolant composition comprising, in weight percent:
between about 0.1 wt % and about 0.5 wt % adipic acid,
between about 1.0 wt % and about 2.0 wt % sebacic acid,
between about 0.1 wt % and about 0.5 wt % of at least one of mercaptobenzothiazole, benzotiiazole, or tolyltriazole,
between about 80 wt % to about 99 wt % of at least one of ethylene glycol or propylene glycol, and
optionally between about 0.1 wt % and about 0.5 wt % molybdate salts.

12. The composition of claim 11 consisting essentially of, in weight percent:
between about 0.1 wt % and about 0.5 wt % adipic acid,
between about 2.0 wt % and about 3.0 wt % of an aliphatic dicarboxylic acid pr a salt thereof, said dicarboxylic acid selected from the group consisting of: sebacic acid dodecanedioic acid, and a mixture thereof,
between about 0.5 wt % and about 2.5 wt % benzoic acid,
between about 0.1 wt % and about 0.5 wt % nitrite salts,
between about 0.1 wt % and about 0.5 wt % nitrate salts,
between about 0.1 wt % and about 0.5 wt % molybdate salts,
between about 0.1 wt % and about 0.5 wt % of at least one of mercaptobenzothiazole, benzotriazole, or tolyltriazole, and
between about 80 wt % to about 99 wt % of at least one of ethylene glycol or propylene glycol.

13. An engine coolant composition comprising:
an organic acid component, said organic acid component comprising adipic acid and at least one of benzoic acid and a $C_9$–$C_{12}$ aliphatic dicarboxylic acid or salts of these acids;
an anticorrosion additive including molybdate, and at least one of mercaptobenzothiazole, benzotriazole, tolyltriazole, nitrite, nitrate, and silicate;
a buffer component comprising at least one of a borate salt or a phosphate salt; and
hard water.

14. The coolant composition of claim 13 comprising a freezing point depressant.

15. The coolant composition of claim 13 wherein the adipic acid or a salt thereof is included in an amount between about 0.1 wt % and about 5 wt %, measured as the free acid and based on the total weight of the coolant composition.

16. The coolant composition of claim 13 comprising between about 0.5 wt % and about 10 wt % of the organic acid component, measured as the free acid and based upon the total weight of the coolant composition.

17. The coolant composition of claim 13 wherein the benzoic acid or $C_9$–$C_{12}$ aliphatic dicarboxylic acid or a salt thereof is included in an amount between about 0.5 wt % and about wt %, measured as the free acid and based on the total weight of the coolant composition.

18. The coolant composition of claim 13 provided to have a pH level between about 7.5 and about 11 pH units.

19. A method of reducing the corrosion of metal surfaces in a cooling system having a recirculating liquid coolant comprising hard water, said method comprising:
adding to said liquid coolant, an additive comprising an organic acid component or salt thereof, said acid component comprising a mixture of a $C_4$–$C_6$ dicarboxylic acid and at least one of benzoic acid or a $C_9$–$C_{12}$ aliphatic dicarboxylic acid; and an anti-corrosion additive including molybdate, and at least compound selected from the group consisting of: mercaptobenzothiazole, benzotriazole, tolyltriazole, nitrite, nitrate, and silicate.

20. The method of claim 19 wherein the liquid coolant is maintained at a pH level between about 7.5 and about 11 pH units.

21. The method of claim 19 wherein the $C_4$–$C_6$ dicarboxylic acid or salt thereof is added in an amount sufficient to enhance the inhibition of corrosion of aluminum containing components relative to a liquid coolant without the $C_4$–$C_6$ dicarboxylic acid or salt thereof.

22. The method of claim 19 wherein the additive comprising a buffer agent selected from the group consisting of: borates, phosphates, benzoates and mixtures thereof.

23. The coolant composition of claim 1 wherein the acid component, the anticorrosion component, and the buffer component are dissolved.

24. The coolant composition of claim 1 comprising hard water.

25. A coolant composition comprising, in weight percent:
between about 0.1 wt % and about 0.5 wt % adipic acid,
between about 1.0 wt % and about 2.0 wt % sebacic acid,
between about 0.1 wt % and about 0.5 wt % of at least one of mercaptobenzothiazole, benzotriazole, or tolyltriazole,
between about 30 wt % to about 70 wt % of at least one of ethylene glycol or propylene glycol, and
optionally between about 0.1 wt % and about 0.5 wt % molybdate salts.

* * * * *

UNITED STATES PATENT AND TRADEMARK OFFICE
CERTIFICATE OF CORRECTION

PATENT NO.         : 6,953,534 B1
APPLICATION NO. : 09/611413
DATED                  : October 11, 2005
INVENTOR(S)       : R. Douglas Hudgens It is certified that error appears in the above-identified patent and that said Letters Patent is hereby corrected as shown below:

The title page should be deleted and substitute therefore the attached title page.

Delete Figs. 1 & 2 and substitute therefore Figs. 1 & 2 as shown on the attached page.

Substitute the attached formal drawings.

Col. 6, line 13, please add a period after the word --water.--

Col. 8, line 62, please delete the extra space between "T he"

Col. 8, line 64, please delete the "t" after the word "The"

Col. 8, line 64, please delete the extra space between "we re"

Claim 1, col. 9, line 65, please delete the words "and at least one of benzoic acid," and insert in lieu thereof --an aromatic carboxylic acid,--

Claim 1, col. 9, line 66, please add the word --optionally-- prior to "a $C_9$-$C_{12}$"

Claim 4, col. 10, line 16, please delete the words "benzoic acid" and insert in lieu thereof --an aromatic carboxylic acid,--

Claim 4, col. 10, line 17, please add the word --the-- after the word "or"

Claim 12, col. 11, line 16, please delete "pr" after the word "acid" and insert in lieu thereof --or--

Claim 13, col. 11, line 33, please delete the words "benzoic acid" and insert in lieu thereof --an aromatic carboxylic acid--

Claim 17, col 12, line 6, please insert the number --5-- in-between "about" and "wt"

UNITED STATES PATENT AND TRADEMARK OFFICE
CERTIFICATE OF CORRECTION

PATENT NO. : 6,953,534 B1
APPLICATION NO. : 09/611413
DATED : October 11, 2005
INVENTOR(S) : R. Douglas Hudgens It is certified that error appears in the above-identified patent and that said Letters Patent is hereby corrected as shown below:

Claim 19, col 12, line 16, please delete the words "benzoic acid" and insert in lieu thereof --an aromatic carboxylic acid--

Signed and Sealed this

Thirty-first Day of October, 2006

JON W. DUDAS
*Director of the United States Patent and Trademark Office*

United States Patent
Hudgens

(12) United States Patent
(10) Patent No.: US 6,953,534 B1
(45) Date of Patent: *Oct. 11, 2005

(54) ENGINE ANTIFREEZE COMPOSITION

(75) Inventor: R. Douglas Hudgens, Cookeville, TN (US)

(73) Assignee: Fleetguard, Inc., Nashville, TN (US)

(*) Notice: Subject to any disclaimer, the term of this patent is extended or adjusted under 35 U.S.C. 154(b) by 206 days.

This patent is subject to a terminal disclaimer.

(21) Appl. No.: 09/611,413

(22) Filed: Jul. 6, 2000

(51) Int. Cl.$^7$ .................................................. C09K 5/00
(52) U.S. Cl. ........................ 252/73; 252/71; 252/74; 252/75; 252/76; 252/78.3; 252/380; 252/387; 252/388; 252/389.2
(58) Field of Search ................... 252/71, 74, 75, 252/76, 78.3

(56) References Cited

U.S. PATENT DOCUMENTS

| | | | |
|---|---|---|---|
| 3,607,757 A | 9/1971 | McDonald | 252/75 |
| 3,931,029 A | 1/1976 | Dutton et al. | 252/76 |
| 4,342,596 A | 8/1982 | Conner, Sr. | 106/14.13 |
| 4,382,008 A | 5/1983 | Boreland et al. | 252/75 |
| 4,452,758 A | 6/1984 | Wilson et al. | 422/15 |

(Continued)

FOREIGN PATENT DOCUMENTS

| | | |
|---|---|---|
| DE | 195 47 499 | 5/1997 |
| EP | 0242900 B1 | 7/1991 |
| EP | 0552988 A1 | 7/1993 |
| EP | 0739 965 | 10/1996 |
| GB | 2 049 650 | 12/1980 |
| GB | 2 138 837 | 10/1984 |

OTHER PUBLICATIONS

Abstract: Database WPI Section Ch, Week 199313, Derwent Publications Ltd., Xp–002260154.

(Continued)

Primary Examiner—Yogendra N. Gupta
Assistant Examiner—D. G. Hamlin
(74) Attorney, Agent, or Firm—Woodard, Emhardt, Moriarty, McNett & Henry LLP

(57) ABSTRACT

In general this invention relates to an antifreeze composition that can be used in the cooling systems of internal combustion engines, for example, in heavy-duty diesel engines, light duty trucks and cars. The antifreeze composition can be added to water or other suitable liquid coolant in the cooling system, to lower the freezing point temperature of the coolant and inhibit corrosion of metallic components associated with the cooling system. The antifreeze composition is particularly well suited, although not exclusively, for use with hard water. The antifreeze composition includes an organic acid component comprising adipic acid and at least one of benzoic acid and one or more $C_9$–$C_{12}$ dicarboxylic acid—or salts of these acids. The antifreeze composition also includes other anti-corrosive additive, for example, molybdate, nitrite, nitrate silicate azoles and a variety of buffer agents.

25 Claims, 1 Drawing Sheet